United States Patent [19]

Holland et al.

[11] 4,121,606
[45] Oct. 24, 1978

[54] INFLATABLE AIR INLET DUCT

[75] Inventors: Charles L. Holland, Escondido; George B. Nicoloff, San Diego, both of Calif.

[73] Assignee: General Dynamics Corporation, San Diego, Calif.

[21] Appl. No.: 845,172

[22] Filed: Oct. 25, 1977

[51] Int. Cl.² ............................................. B64D 33/02
[52] U.S. Cl. .................................. 137/15.1; 244/53 B
[58] Field of Search ........................... 137/15.1, 15.2; 244/53 B, 219

[56] References Cited

U.S. PATENT DOCUMENTS

| | | | |
|---|---|---|---|
| 3,074,232 | 1/1963 | Soyer | 244/53 B |
| 3,119,581 | 1/1964 | Trevaskis | 244/53 B |
| 3,482,783 | 12/1969 | Nebiker | 239/265.15 |

Primary Examiner—Alan Cohan
Attorney, Agent, or Firm—John R. Duncan

[57] ABSTRACT

An air inlet duct for a jet propulsion missile or other vehicle which is movable between a housed, pre-launch position and an extended or deployed flight position. A method of manufacturing the duct is also disclosed. The duct system includes a flexible leading edge attached to a double-wall inflatable duct body. Drop threads extend between the duct body walls to hold an exact desired contour when the duct is inflated. A pivotable plate moves the inflatable duct between a housed, deflated, position and an inflated flight position. Manufacture of the inflatable duct is basically accomplished by preparing a foamed plastic form in the desired duct wall shape, covering the form with fabric, stitching through the foam and fabric, coating the fabric with a flexible sealing compound, dissolving away the foamed plastic and attaching the resulting inflatable duct to other missile components.

3 Claims, 10 Drawing Figures

INFLATABLE AIR INLET DUCT

BACKGROUND OF THE INVENTION

This invention relates in general to air inlet ducts for jet engines and, more particularly, to an inflatable duct for such engines.

Many missiles, remotely piloted vehicles, etc., are desirably launched from a container or canister which houses and protects the missile during handling and shipping and also acts as a guide during launch. Generally, the launch canister has a cylindrical cross section, which requires that any wings, fins, etc., collapse within the missile body until the missile exits the canister. Where the missile is powered by an air-breathing jet engine, an air inlet duct must be provided which does not project beyond the missile contour until the missile has exited the launch canister and automatically deploys after launch. Typical of such missiles is a submarine-launched cruise missile which is launched from a narrow cylindrical torpedo tube.

A variety of movable, folding or collapsible metal air inlet ducts have been used in the past. While effective in many applications, prior deployable inlets tended to be mechanically complex and heavy, occupied an undesirably large portion of the missile volume when housed, and to have undesirably high radar reflection characteristics.

Thus, there is a continuing need for improved deployable inlet ducts for use with jet-propelled missiles or other vehicles.

OBJECTS OF THE INVENTION

It is, therefore, an object of this invention to provide a deployable air inlet duct overcoming the above noted problems.

Another object of this invention is to provide a deployable air inlet duct of improved simplicity and reliability.

A further object of this invention is to provide a light-weight, deployable air inlet duct occupying a small volume when housed.

Yet another object of this invention is to provide a deployable fair inlet having a reduced radar reflection cross section when deployed.

Still another object of this invention is to provide a simple and effective method of manufacturing a deployable air inlet duct.

SUMMARY OF THE INVENTION

The above objects, and others, are accomplished in accordance with this invention by an inflatable air inlet and method of manufacturing that duct.

The inlet duct system basically has a scoop-like shape when deployed, with an inlet opening spaced slightly from the vehicle skin surface for receiving air and an outlet end extending into the vehicle with an outlet opening delivering air to a jet engine within the vehicle. The duct system includes a surface closure plate movable between a housed position within the vehicle to a deployed position substantially flush with the vehicle surface skin. The leading edge of the closure plate may be spaced slightly from the skin, with a plow-like diverter plate filling the gap therebetween. The remainder of the duct system comprises an outer duct formed with two spaced walls of flexible material held in spaced alignment (when the inter-wall space is pressurized) by a plurality of drop threads between the walls. Preferably, the leading edge of the outer duct is formed from a molded elastomer, such as a silicone rubber reinforced with flexible metal cables.

This inflatable air inlet duct is manufactured, basically, by shaping a foamed plastic core to the configuration desired for the outer duct, covering the core with fabric, sewing through the fabric and core, coating the fabric with an elastomeric coating, dissolving the core away, and securing the outer duct to the fixed inner duct and a movable duct plate.

BRIEF DESCRIPTION OF THE DRAWING

Details of the invention, and of a preferred embodiment, will be further understood upon reference to the drawing, wherein.

DETAILED DESCRIPTION OF THE INVENTION

Figure 1:
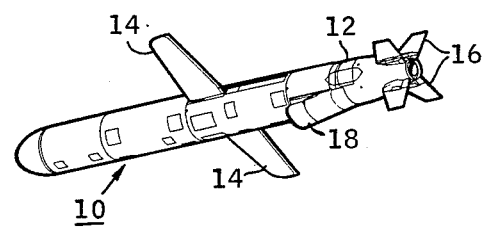
FIG. 1 is a perspective view illustrating the deployable air inlet duct in use on a cruise missile.

Referring now to FIG. 1, there is seen a perspective view of a cruise missile 10 in flight, seen from below the missile. Such missiles typically are powered by turbofan engines located in the aft body 12. The missile utilizes wings 14 for lift and fins 16 for control. Air for the engine enters through inlet 18. Since cruise missiles may be launched from submarine torpedo tubes, ground or ship-based canisters and aircraft launch racks, it is necessary that wings 14 and fins 16 fold and that inlet 18 be retracted prior to launch. Immediately upon launch, wings 14, fins 16 and inlet 18 must quickly and positively deploy.

While the deployable air inlet duct of this invention is especially applicable to cruise missiles, it may be used in any suitable application. For example, a deployable inlet would be useful to direct air to a small jet engine powering an emergency power unit in large aircraft. Also, a small emergency jet engine on a sailplane or glider could advantageously utilize a deployable inlet giving low drag when retracted during normal operation and rapid, positive deployment in an emergency.

The arrangement of the inflatable inlet duct in the stowed and deployed positions is shown in FIGS. 2-5.

Figure 2:
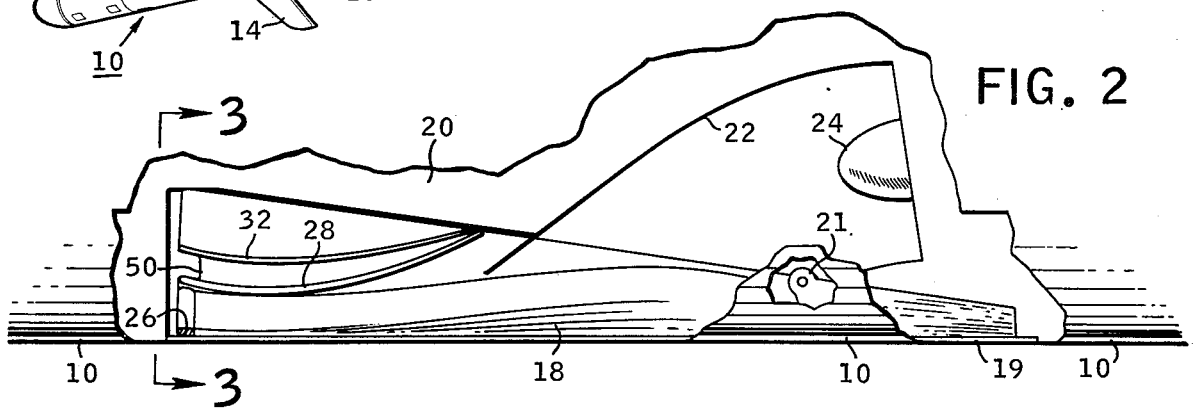
FIG. 2 is a partially cut-away side view of the inflatable inlet duct in the stowed position.

As seen in FIG. 2, deployable inlet duct 18 when collapsed is stowed in a cavity entirely within the outline of missile 10. The stowed inlet duct 18 is closely surrounded by fuel tanks 20 and connects directly to permanent internal duct 22 to direct air to a jet engine schematically indicated at 24. Duct 18 is shown in FIG.

4 after release of cover 19, which acts as a restraining means and inflation of the inflatable outer duct wall as described below. Cover 19 is held in place by conventional latch means (not shown) which can be rapidly released, so that cover 19 will fall away. Duct 18 includes leading edge 26 which, together with duct plate 28, forms a scoop-shaped inlet for admitting air which passes through the conduit formed by outer inflatable duct 30 and permanent duct 22 to engine 24. For reasons of internal aerodynamics, duct plate 28 is spaced slightly by a diverter 50 from missile surface plate 32 which seals the opening through the missile skin into the inlet duct storage volume. When cover 19 is released and falls away, the deployable duct assembly pivots about a pivot point 21 to the deployed position of FIGS. 4 and 5. The folded inflatable duct wall 30 expands as pressurized gas enters thereinto. The inflating gas typically may be supplied by a conventional small pressurized container (not shown) connected to the duct through a quick release valve and hose.

Figure 6:
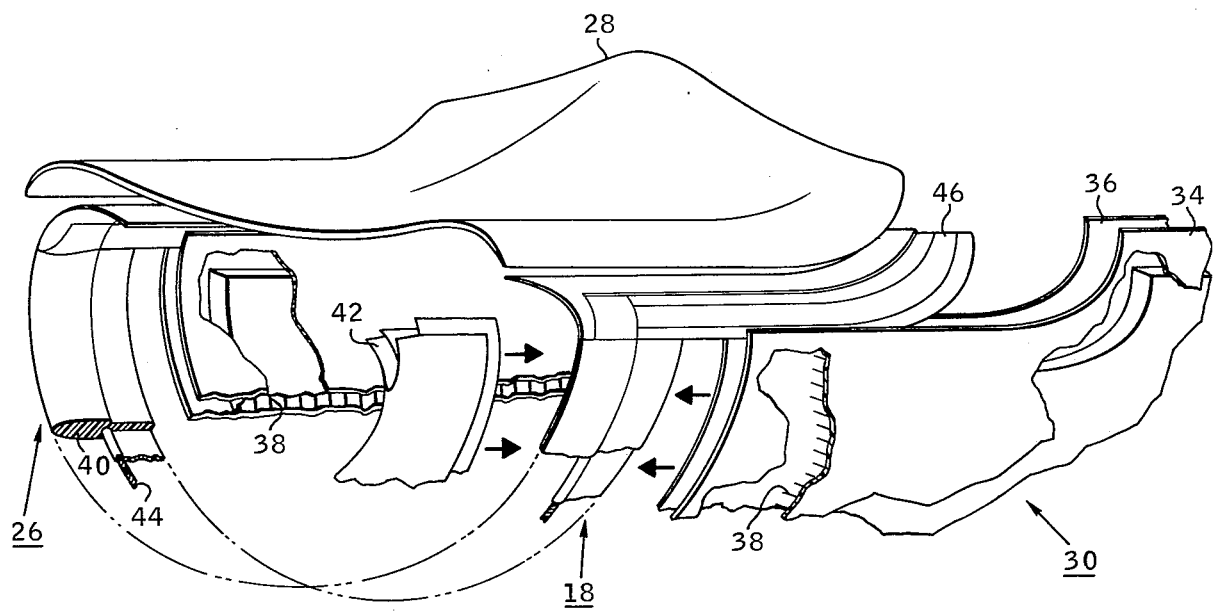
FIG. 6 is an exploded perspective view, partially cut away, of the inflatable inlet duct.
Figure 7:
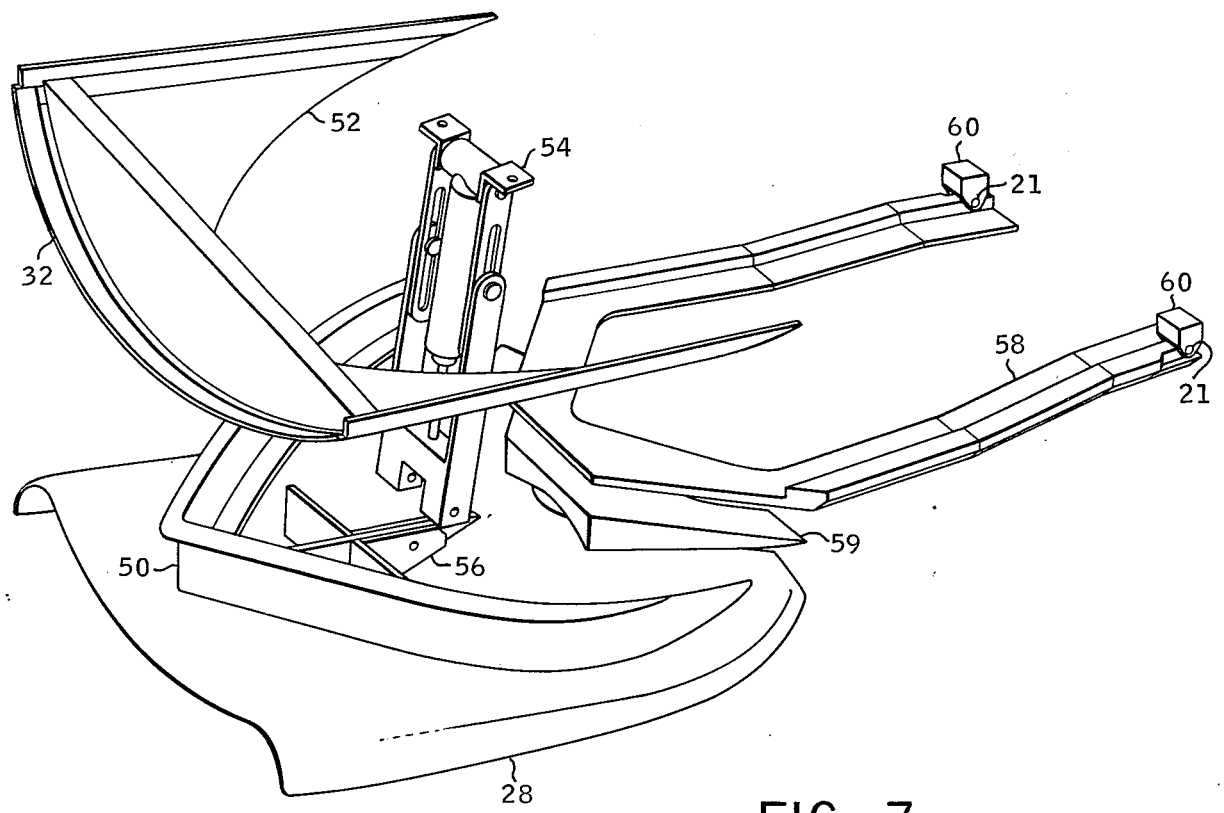
FIG. 7 is an exploded perspective view, partially cut away, showing the inflatable inlet duct supporting and extending means.

Details of the construction of the deployable air inlet duct and its support and deployment means are illustrated in exploded perspective views in FIGS. 6 and 7. As seen in FIG. 6, outer duct wall 30 comprises a pair of spaced sheets 34 and 36 maintained at the proper spacing by a plurality of drop threads 38 when inflated by admission of a pressurized gas therebetween.

At the aft end (not shown) of inflatable duct 18 sheets 34 and 36 are bonded to the entrance of permanent duct 22 with silicone rubber and a bolting strip in a conventional manner.

At the forward end of duct 18, sheets 34 and 36 are fastened to leading edge 26 which comprises a flexible molded leading edge shaped member 40 which may, for example, be molded from silicone rubber. Preferably, the surface of leading edge member 40 is reinforced by several layers of fabric 42, such as a Dacron or Nylon fabric, bonded thereto. Preferably, one or more flexible steel cables 44 run through leading edge 26 to add further strength.

A metal strip 46, conforming to the shape of the edge of upper duct plate 28, is secured to the corresponding edges of sheets 34 and 36. Strip 46 may be fastened to the edge of duct plate 28 by a conventional means, such as rivets.

The mechanism for moving the deployable inlet duct between stowed and deployed positions is shown in exploded form in FIG. 7.

Upper duct plate 28 is spaced from missile surface plate 32 by a diverter 50 which fills the gap between plate 28 and plate 32. Diverter 50 may be fastened to the lower surface of missile surface plate 32 by any conventional means such as rivets extending through schematically illustrated holes 52.

This assembly including surface plate 32 and duct plate 28 is moved between stowed and deployed positions by a conventional hydraulic shock absorption extension strut 54 secured to the missile (not shown) at its upper end and to duct plate 28 through bracket 56 at its lower end. Pivot arms 58 are secured to upper plate 28 by intermediate member 59 and rotate about pivot points 21 in brackets 60 fastened to the missile body (not shown) to move the deployable inlet duct into the proper deployed position.

Figure 8:
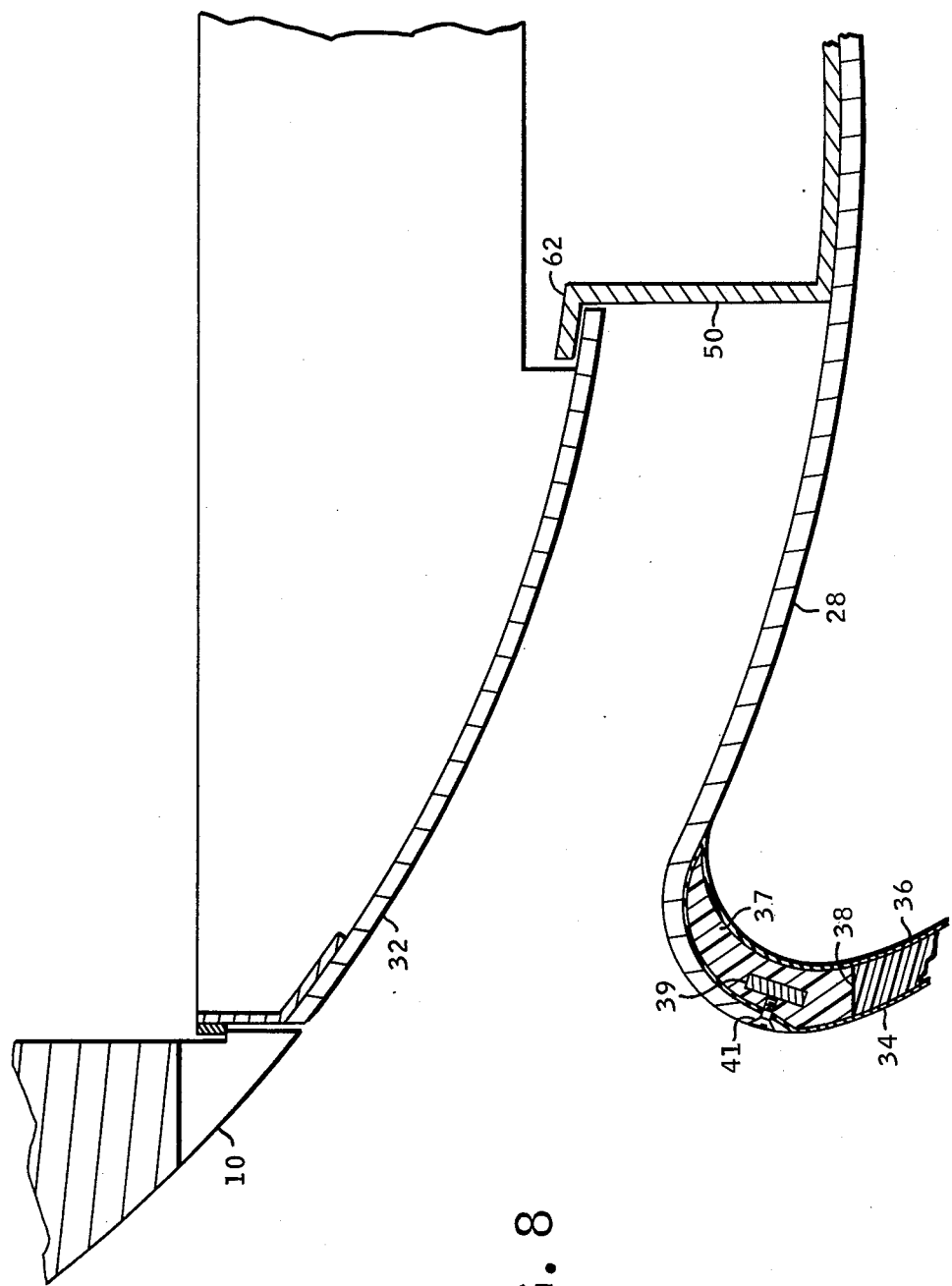
FIG. 8 is a transverse sectional view through the inflatable inlet duct taken on line 8—8 in FIG. 4.

The relationship among these various parts is further shown in the sectional view shown in FIG. 8. As seen here, in the deployed position missile surface plate 32 is flush with the skin of missile 10. Duct plate 28 is spaced from surface plate 32 by diverter 50 which extends between surface plate 32 and duct plate 28. Upper edge 62 of diverter 50 may be secured to surface plate 32 by any suitable means, such as an adhesive or rivets. Duct sheets 34 and 36 are secured to duct plate 28 by adhesive bonding to a molded plastic fillet member 37 located between the walls and conforming to the edge of plate 28. A metal reinforcing bar 39 extends along member 37 and is secured to plate 28 by a plurality of screws 41.

Figure 9:
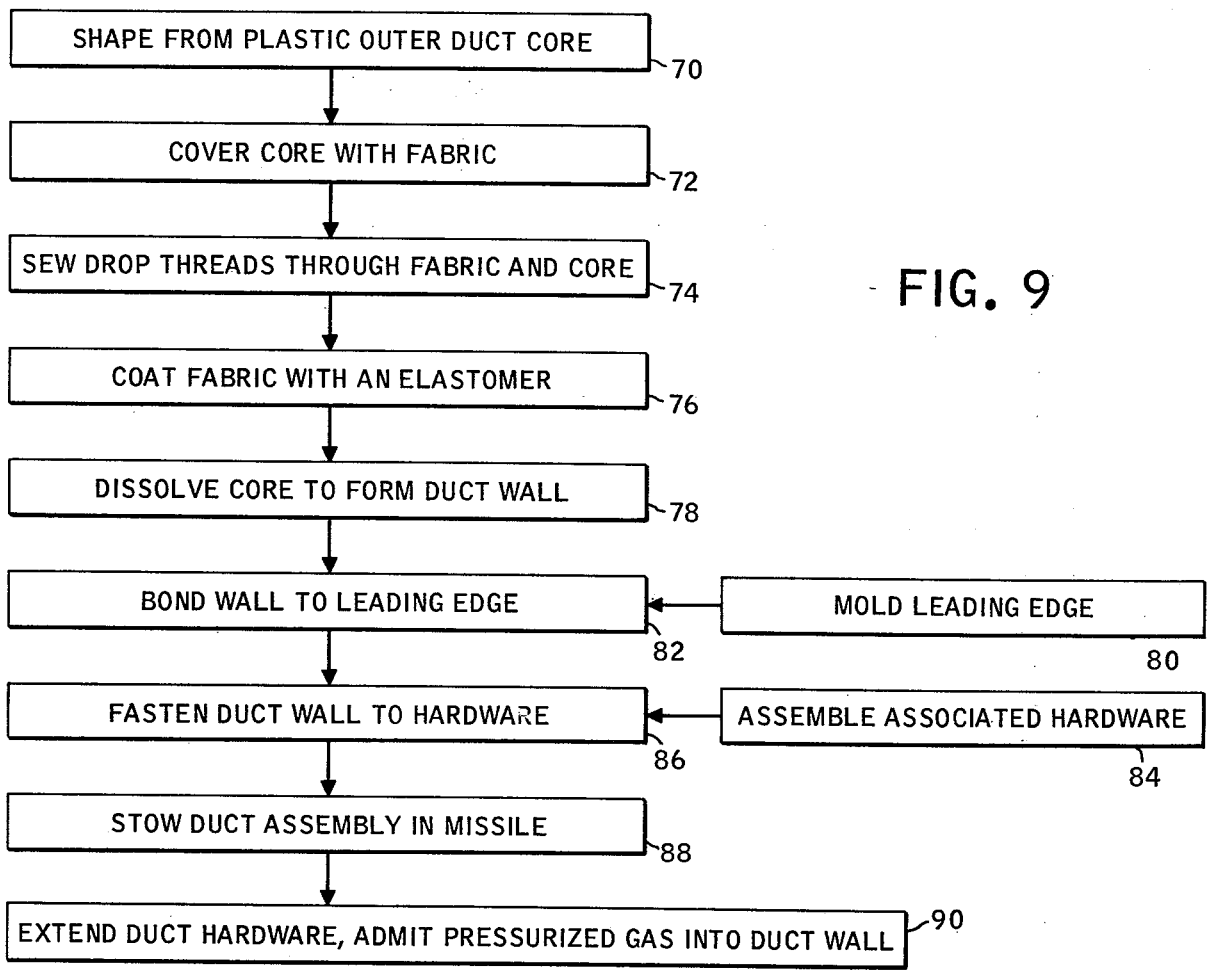
FIG. 9 is a black diagram illustrating the method of manufacturing an inflatable inlet duct.

The method of manufacturing and using this deployable inlet duct is substantially illustrated by the block diagram of FIG. 9, which points out the basic manufacturing steps and steps in operating the system.

Figure 3:
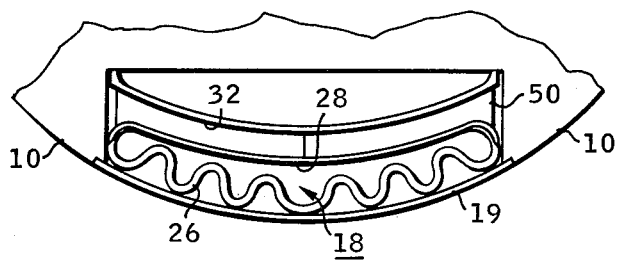
FIG. 3 is a transverse sectional view taken on line 3—3 in FIG. 2.
Figure 4:
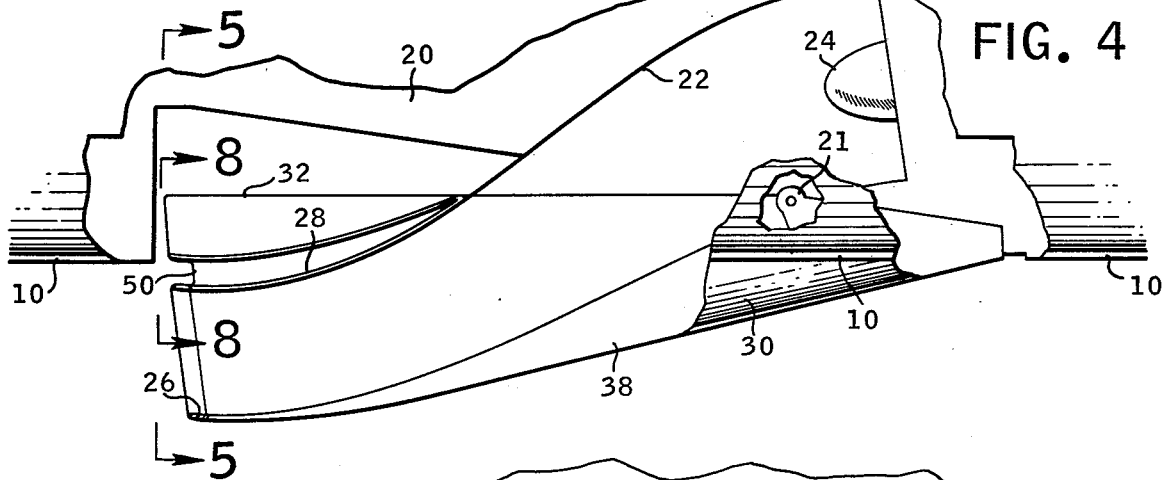
FIG. 4 is a partially cut-away side view of the inflatable inlet duct in the deployed position.
Figure 5:
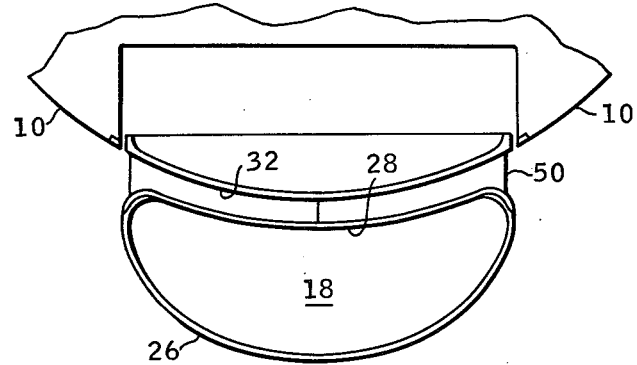
FIG. 5 is a transverse sectional view taken on line 5—5 in FIG. 4.
Figure 10:
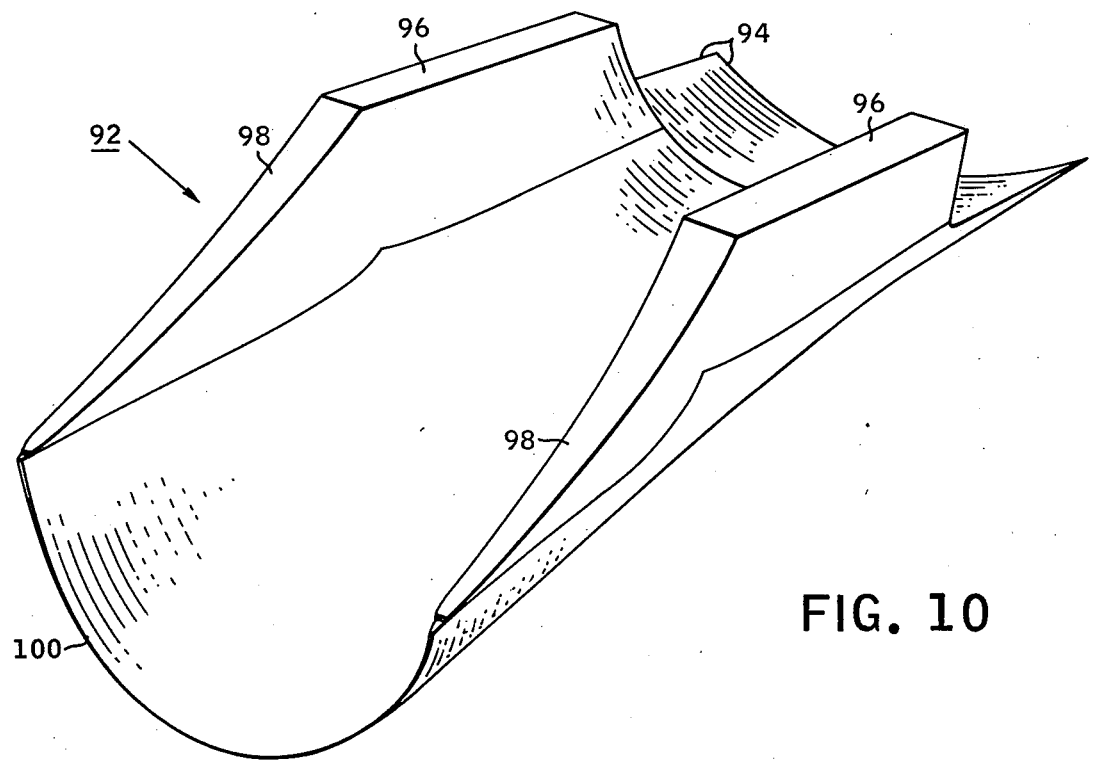
FIG. 10 is a perspective view of the foam core over which fabric is laid to form the outer duct wall.

The first step, as indicated in box 70, is to carve or mold a foam plastic core into the configuration desired for the outer duct wall 30. A typical core 92 is shown in perspective view in FIG. 10. The thickness of the core in the various areas conforms to the desired spacing between sheets 34 and 36 in those areas. The aft end 94 of core 92 conforms to the area of outer duct wall 30 which will be secured to the entrance to permanent duct 22 (as seen in FIG. 3). The upper side edges 96 of core 92 conform to edges of wall 30 which will be secured to the forward side portions of pivot arms 58. Forward upper edges 98 conform to edges of wall 30 which will be fastened to the edges of duct plate 28, as seen in FIG. 4. Forward edge 100 of core 92 conforms to the edges of wall 30 which will be secured to leading edge 26 as seen in FIG. 4.

Core 92 may be fabricated from any suitable material in any suitable manner. Typically, a material may be molded or carved to the desired shape. Foamed plastics, such as "Styrofoam", polystyrene foam from Dow Chemical, are preferred, since they may be easily shaped, easily penetrated by needles for installation of drop threads and easily removed by solvents which do not attack other system components.

Returning now to FIG. 9, the second step, as indicated in box 72, is to cover the core with fabric sheets 34 and 36. One or more pieces and layers of suitable fabric are cut out and laid over the core. The pieces are preferably heatformed to conform to the complex shape of the core. Typical fabric materials include polyester fiber fabrics available from E. I. duPont under the trademark "Dacron", "Kevlar" aramid fibers (duPont) and fiber glass. Dacron is preferred because it can be conveniently heat shaped without losing its properties, is storable over long periods and does not stretch.

Next, drop threads are sewn back and forth through the fabric sheets 34 and 36 and core 92 (box 74). Preferably, the threads are spaced from about 3/16 to ½ inches apart. Any suitable thread material may be used. Typical threads include Dacron and nylon, of which Dacron is preferred because of its excellent strength properties.

After all drop threads 38 are installed, the fabric and outside thread portions are coated with a suitable elastomer (box 76) to hold the threads in place, make the fabric gas impermeable and strengthen the fabric. Silicone rubber is preferred as the coating because of its radar transparency, strength and ease of application.

Next, as indicated in box 78, core 92 is dissolved away with a solvent which does not attack the fabric, drop threads or elastomeric coating. With the preferred materials mentioned above, oxylene is an excellent solvent.

Meanwhile, a leading edge 26 is molded as indicated in box 80. A mold is prepared, any desired reinforcements such as the preferred flexible metal cable 44, are installed and the mold is filled with the selected material, such as the preferred silicone rubber. Upon completion of any required curing, the leading edge is removed from the mold and any desired surface reinforcements, such as fabric layers 42 are applied. Fabric layers 42 preferably consist of one or more layers of Dacron cloth, impregnated with silicone rubber.

The duct wall fabric sheets 34 and 36 are then fastened to leading edge 26 in any suitable manner (box 82). Preferably, they are secured together by overlapping and bonding with silicone rubber.

Meanwhile, as indicated in box 84, the associated hardware, e.g., upper duct plate 28, missile surface closure plate 32, extension strut 54, diverter plate 52 etc., are assembled.

The inlet duct wall 30 is then fastened to the associated hardware (box 86) by any suitable means, such as rivets, or screws and adhesive bonding. Other conventional fittings, such as air inlet fittings to pass pressurized gas through sheet 34 or 36 into hollow wall 30, stowage latches, deployment actuators, etc. are installed and the missile is assembled. The inlet is stowed in the missile body (box 88), as shown in FIGS. 2 and 3 and assembly is complete.

When the missile is fired, e.g., from a torpedo tube or ground launch canister, deployment of wings, fins and inlet is initiated in a conventional manner by missile operating systems. Cover 19 holding the deployable inlet in the stowed position is released, pressurized gas is admitted into wall 30 and the inlet moves from the stowed position (FIGS. 2 and 3) to the deployed position (FIGS. 4 and 5) as indicated in box 90. If the duct is incorporated in a reusable system, such as an airplane, the duct can be deflated and re-stowed for reuse.

While certain specific materials, arrangements and preparations have been specified in the above description of a preferred embodiment, these can be varied where suitable with similar results. Other variations, ramifications and applications of this invention will occur to those skilled in the art upon reading this application. These are intended to be included within the scope of this invention as defined by the appended claims.

We claim:

1. A deployable air inlet duct having a scoop shape with an inlet opening for receiving air and an outlet opening for directing air to a jet engine, which comprises:
    a surface closure plate movable between a housed position within a vehicle skin surface and a deployed position substantially flush with said skin surface;
    an inner duct plate secured to the outer side of said surface closure plate and substantially parallel thereto;
    means for moving said surface closure plate from said housed position to said deployed position;
    an outer duct wall comprising two spaced sheets of flexible material;
    a plurality of drop threads extending between said spaced sheets;
    a flexible leading edge partially surrounding the inlet opening and secured to said outer duct wall and said inner duct plate; and
    means to admit gas under pressure between said sheets whereby said outer duct wall is inflated and a rigid duct between said inlet and outlet openings is formed.

2. The deployable air inlet duct according to claim 1 wherein a plow-shaped diverter is located between said surface closure plate and said inner duct plate.

3. The deployable air inlet duct according to claim 1 wherein said flexible leading edge comprises a silicone rubber body, at least one flexible metal cable within said body located substantially parallel to the air entrance edge of said leading edge, and at least one layer of polyester fiber fabric impregnated with silicone rubber.

* * * * *